(12) United States Patent
Kordass et al.

(10) Patent No.: US 8,939,019 B2
(45) Date of Patent: Jan. 27, 2015

(54) HOLDING DEVICE FOR A FUEL INJECTOR

(75) Inventors: Sven Kordass, Koengen (DE); Joerg Staib, Boll (DE); Reinhard Hoss, Plochingen (DE); Neela Lohith Paruchuri, Bengaluru (IN)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 13/813,854

(22) PCT Filed: Jul. 27, 2011

(86) PCT No.: PCT/EP2011/062886
§ 371 (c)(1),
(2), (4) Date: Apr. 9, 2013

(87) PCT Pub. No.: WO2012/016894
PCT Pub. Date: Feb. 9, 2012

(65) Prior Publication Data
US 2013/0206937 A1    Aug. 15, 2013

(30) Foreign Application Priority Data
Aug. 2, 2010 (DE) .......................... 10 2010 038 760

(51) Int. Cl.
*F02M 65/00* (2006.01)
*F16M 13/00* (2006.01)
*F16M 11/04* (2006.01)

(52) U.S. Cl.
CPC ............... *F16M 13/00* (2013.01); *F02M 65/00* (2013.01); *F02M 65/001* (2013.01); *F16M 11/04* (2013.01)
USPC .................... 73/114.45; 73/114.77; 73/116.01

(58) Field of Classification Search
CPC ... F02M 65/00; F02M 65/001; F02M 65/006; G01M 15/02
USPC .............. 73/114.45, 114.46, 114.47, 114.48, 73/114.49, 114.51, 114.77, 116.01, 116.02
See application file for complete search history.

(56) References Cited

U.S. PATENT DOCUMENTS

| 4,061,027 A | * | 12/1977 | Emerson .................... 73/114.45 |
| 4,845,979 A | * | 7/1989 | Farenden et al. .......... 73/114.45 |
| 5,317,911 A | * | 6/1994 | Yaraschefski .............. 73/114.45 |
| 6,234,002 B1 | * | 5/2001 | Sisney et al. ................... 73/1.57 |

(Continued)

FOREIGN PATENT DOCUMENTS

| DE | 11 04 198 | 4/1961 |
| EP | 0 153 142 | 8/1985 |
| FR | 1 320 464 | 3/1963 |

OTHER PUBLICATIONS

International Search Report, International Application No. PCT/EP2011/062886, dated Apr. 16, 2012.

*Primary Examiner* — Eric S McCall
(74) *Attorney, Agent, or Firm* — Kenyon & Kenyon LLP

(57) ABSTRACT

A holding device for a fuel injector has a mounting device to accommodate the fuel injector, and a fixing device which has a first part and a second part, which are supported in a guidance in a displaceable manner with respect to the mounting device. The second part is fixable on the guidance and between the first part and the second part of the fixing device an elastic element is situated in such a way that it is in a position to press the first part of the fixing device against a fuel injector situated in the mounting device, in order to fix it in the holding device. Also described is a clamping device for fuel injectors having at least one holding device, which is fastened elastically to the clamping device.

10 Claims, 4 Drawing Sheets

(56) References Cited

U.S. PATENT DOCUMENTS

| | | | |
|---|---|---|---|
| 6,536,269 B1 * | 3/2003 | Nemie et al. | 73/114.45 |
| 6,604,413 B2 * | 8/2003 | Panek et al. | 73/116.04 |
| 7,409,874 B2 * | 8/2008 | Walsh et al. | 73/861.42 |
| 7,735,361 B2 * | 6/2010 | Hoss | 73/114.45 |
| 8,646,322 B2 * | 2/2014 | Henner et al. | 73/114.48 |
| 2005/0034514 A1 * | 2/2005 | Shen | 73/119 A |
| 2007/0240500 A1 * | 10/2007 | Pollard et al. | 73/119 A |
| 2008/0282785 A1 * | 11/2008 | Hoss | 73/114.45 |
| 2009/0019935 A1 * | 1/2009 | Horak | 73/593 |
| 2013/0025354 A1 * | 1/2013 | Henner et al. | 73/114.48 |
| 2013/0220275 A1 * | 8/2013 | Stein et al. | 123/447 |
| 2013/0240062 A1 * | 9/2013 | Hoss | 137/544 |
| 2013/0291631 A1 * | 11/2013 | Kordass et al. | 73/116.01 |

\* cited by examiner

HOLDING DEVICE FOR A FUEL INJECTOR

FIELD

The present invention relates to a holding device for a fuel injector, particularly a holding device for a fuel injector for use on a test stand.

BACKGROUND INFORMATION

In order to test fuel injectors on a test stand, the fuel injector to be tested is clamped in a holding device, connected to its fluid supply and driven electrically. The injection quantities and the return flow quantities are measured and evaluated.

Conventional clamping and holding devices for fuel injectors require much effort and/or are costly.

Therefore, it is the objective of the present invention to provide an improved clamping and holding device for fuel injectors which are simple to operate and cost-effective to produce, without negatively influencing the accuracy and reproducibility of the measurement results.

SUMMARY

In accordance with the present invention, a holding device for a fuel injector is provided having a receptacle developed to accommodate a region of the fuel injector, and a fixing device which has a first part and a second part, which is supported in a guide in a slidable manner with respect to the receptacle. The second part is able to be fixed on the guide in such a way that it is no longer displaceable, and between the first part and the second part of the fixing device an elastic element is situated in such a way that it supports the first part of the fixing device elastically on the second part, and is in a position to press the first part of the fixing device against a fuel injector situated in the receptacle in such a way that it is fixed securely in the receptacle.

The receptacle is advantageously modeled on the injector receptacle in a cylinder head, and it makes possible an accommodation of the fuel injector, that is to be tested, that is particularly close to reality. Because of the displaceability of the fixing device, the holding device is able to be adjusted in a stepless manner to the length of the respective fuel injector. Because of the elastic element, the fuel injector is able to be pressed against the receptacle with a specified contact pressure and fixed in the holding device. This results in good reproducibility of the measurement results.

In one specific embodiment, the holding device has an eccentric shaft which is adjustable, particularly rotatable between a clamped position, in which the elastic element presses the first part of the fixing device against the fuel injector, and a release position, in which the elastic element does not exert any force on the first part of the fixing device. Because of such an eccentric shaft, the fuel injector is fixed particularly easily in the holding device without a tool, and is able to be fixed in the holding device at a specified contact force.

In one specific embodiment, an injection chamber is developed in the first part of the fixing device so that the fuel injector injects fluid into the injection chamber during testing operation. Because of the integration of an injection chamber into the fixing device, the design of a test stand is simplified by using a holding device according to the present invention. In particular, the fuel injector is fixed automatically by the holding device in a specified position with respect to the injection chamber. In this way, the accuracy and reproducibility of the measurement results in the testing operation are thus further improved.

In one specific embodiment, the receptacle is developed to accommodate an exchangeable clamping plate, the fuel injector being able to be accommodated and fixed in the clamping plate. One holding device according to the present invention is able to be adapted simply and cost-effectively to different, and even future types of injector by using different, appropriately adapted clamping plates.

The fuel injector is able to be accommodated in the receptacle and held by the latter, in a manner particularly close to reality, by exchangeable clamping plates, which are each adapted to the type of injector that is to be tested. In particular, mechanical stresses, which could have a negative effect on the measurement results, are able to be largely avoided. Because of the exchangeability of the clamping plates, the holding device is suitable for the best possible accommodation of different types of injector.

In one specific embodiment, an exchangeable test adaptor is provided, which is developed to supply (testing) fluid to the fuel injector in testing operation.

Because of the exchangeable testing adaptor, fluid is able to be supplied to the fuel injector in testing operation, under realistic conditions. For the fluid supply, rigid test pressure lines may be used, which are more favorable and more durable than flexible high pressure tubes. Since the test pressure lines do not have to be bent, one may particularly also use thicker pressure lines having a greater outside diameter, which are not manually flexible. Because the lines are not bent, their service life is extended. In the case of cold-worked lines, it is prevented that the cold-working is nullified by deformation of the lines.

When the fuel injector is changed, the test pressure lines are able to remain connected to the test adaptor, and do not have to be screwed on and unscrewed. This makes exchanging the test adapter easier. Because of pressure pipe connections that are developed upright, no (bracing) forces caused by torsion of the pressure pipe connection are able to be created, which could corrupt the measurement results.

In one specific embodiment, the test adapter is mounted on the holding device, displaceably with respect to the receptacle. This makes possible a simple and convenient introduction of the fuel injector, that is to be tested, into the holding device, and adaptation to different lengths of injectors.

In one specific embodiment, the test adapter is developed to fix the fuel injector elastically in the receptacle. This makes it easier to introduce and fix the fuel injector into the holding device according to the present invention.

In one specific embodiment, the second part of the fixing device is able to be fixed on the guide by a clamping device. Because of a clamping device, it is particularly simple and reliable to fix the second part of the fixing device in any desired position on the guide.

The present invention also includes a clamping device for fuel injectors having at least one holding device, the at least one holding device being supported elastically on the clamping device. By an elastic support of the holding device, transverse forces acting on the fuel injector and/or the fuel supply lines are minimized. Because of that, both the durability of the fuel supply lines and the reproducibility and accuracy of the test results are improved.

One clamping device according to the present invention is able to be adapted simply and cost-effectively to future types of injector, perhaps by using new, adapted holding devices.

In one specific embodiment, the clamping device has a distributor rail which is supported displaceably with respect to the at least one holding device. Because of the displaceable distributor rail, which is developed to supply the fuel injectors that are to be tested with fluid, it is possible to connect the most varied types of injector to the same rigid fluid lines. Therefore, one clamping device according to the present invention is suitable for a plurality of different types of injector, durable and cost-effective rigid fluid lines having great pressure resistance being able to be used.

In one specific embodiment, flexible pressure tubes are used instead of rigid test pressure lines.

In one specific embodiment, a plurality of distributor rails are used to supply the fuel injectors with fluid.

In one specific embodiment, the holding devices are suspended Cardanically on the clamping device. A Cardanic suspension makes possible particularly great flexibility in response to the spatial orientation of the holding devices and the clamped fuel injectors.

In one specific embodiment, a flexible high pressure adapter that is movable is situated between a rigid fluid line and the clamped fuel injector. Such a flexible high pressure adapter makes it possible largely to compensate for displacements between the rigid fluid lines and the clamped fuel injector, and to minimize mechanical stresses in the test setup.

Below, the present invention is explained in greater detail with reference to the figures.

DETAILED DESCRIPTION OF EXAMPLE EMBODIMENTS

Figure 1:
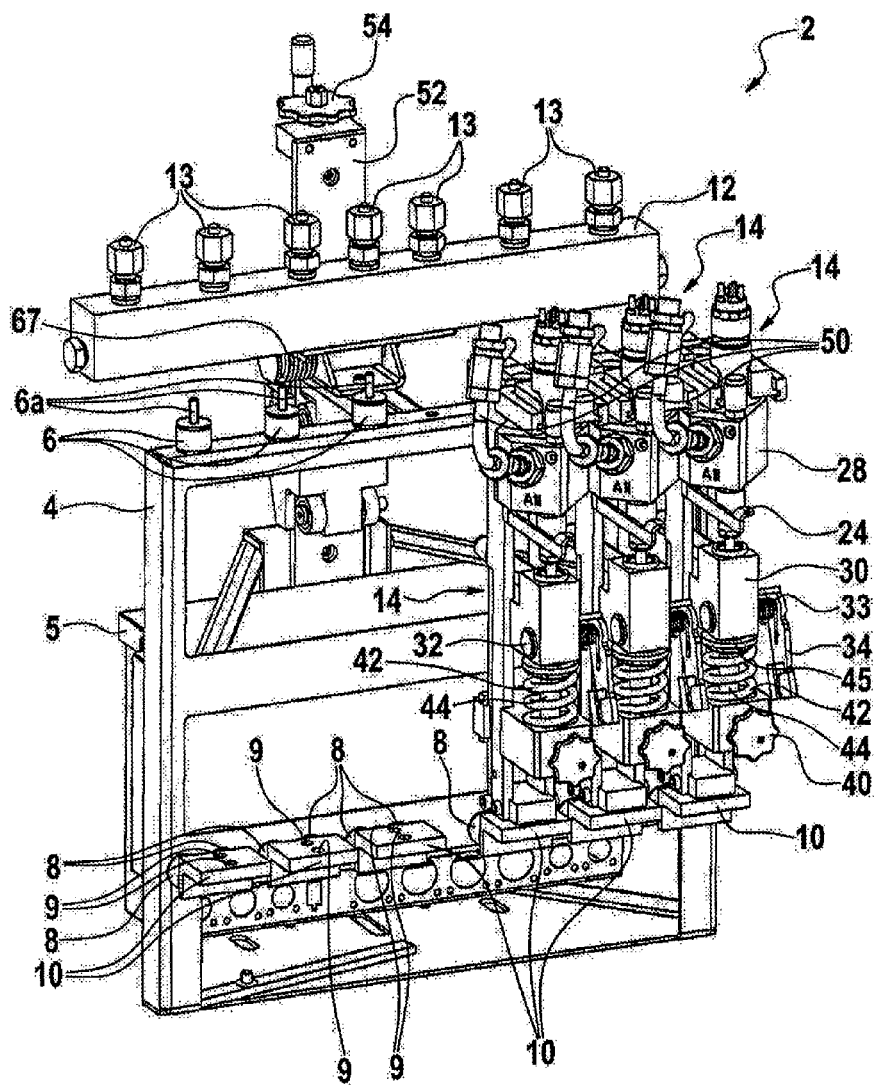
FIG. 1 shows a perspective front view of a clamping device having three example holding devices according to the present invention.

FIG. 1 shows a perspective front view of an example clamping device 2 according to the present invention.

Clamping device 2 according to the present invention has a vertically running guide rail 52 which is formed of flat steel, for example. On the guide rail, a frame 4, which is developed to accommodate a plurality of holding devices 14 according to the present invention, and a distributor rail 12, that is supported parallel to guide rail 52, displaceably with respect to frame 4, is mounted.

Distributor rail 12, on its upper side, has a number of fluid connectors 13, which are each developed for connecting fluid supply lines not shown in the figure.

On an upper end face of frame 4, a plurality of cylinder-shaped first elastic elements 6 are situated, on its upper side facing away from frame 4 in each case a cylinder bolt 6a is developed, which is each provided to accommodate and fasten a holding device 14 according to the present invention.

In a lower region of frame 4, on the front side facing the observer, of frame 4, two cylindrically developed elastic elements 8 are situated, which, with respect to first elastic elements 6, are situated rotated by 90°, so that their axes run in a horizontal plane, transversely to the plane of frame 4.

On respectively two adjacent second elastic elements 8 there is fastened an angle 10 having a vertical leg, which is aligned parallel to the plane of frame 4, and having a horizontal leg, which is aligned at right angles to the vertical leg.

In each of the horizontal legs, two bores 9 each, for accommodating and fixing one holding device 14, according to the present invention, are developed.

Frame 4 is developed in such a way that, on its rear side, facing away from the observer, a driving unit 5, which is developed for driving the fuel injectors that are to be tested, is able to be mounted.

In the exemplary embodiment shown in FIG. 1, three holding devices 14, according to the present invention, have been mounted on frame 4. Because of elastic elements 6, 8, holding devices 14 are supported elastically, so that the tolerances of the dimensions of the fuel injectors and/or of the fluid lines are able to be compensated for by the deformation of elastic elements 6, 8 and only slight lateral forces act on the fuel injectors, that are not shown in FIG. 1, when they are clamped into holding devices 14.

Figure 2:
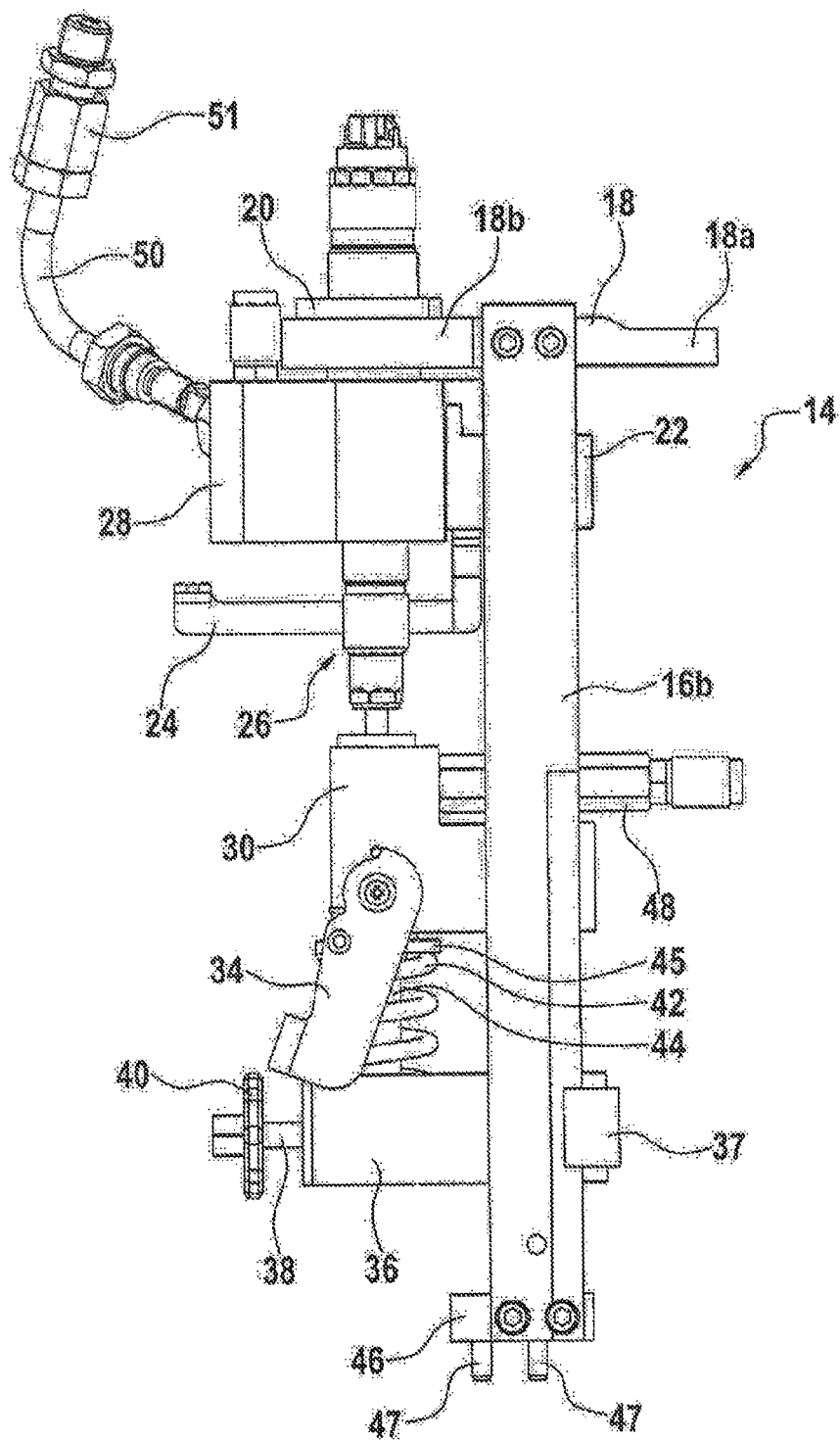
FIG. 2 shows a side view of an example holding device according to the present invention.
Figure 3:
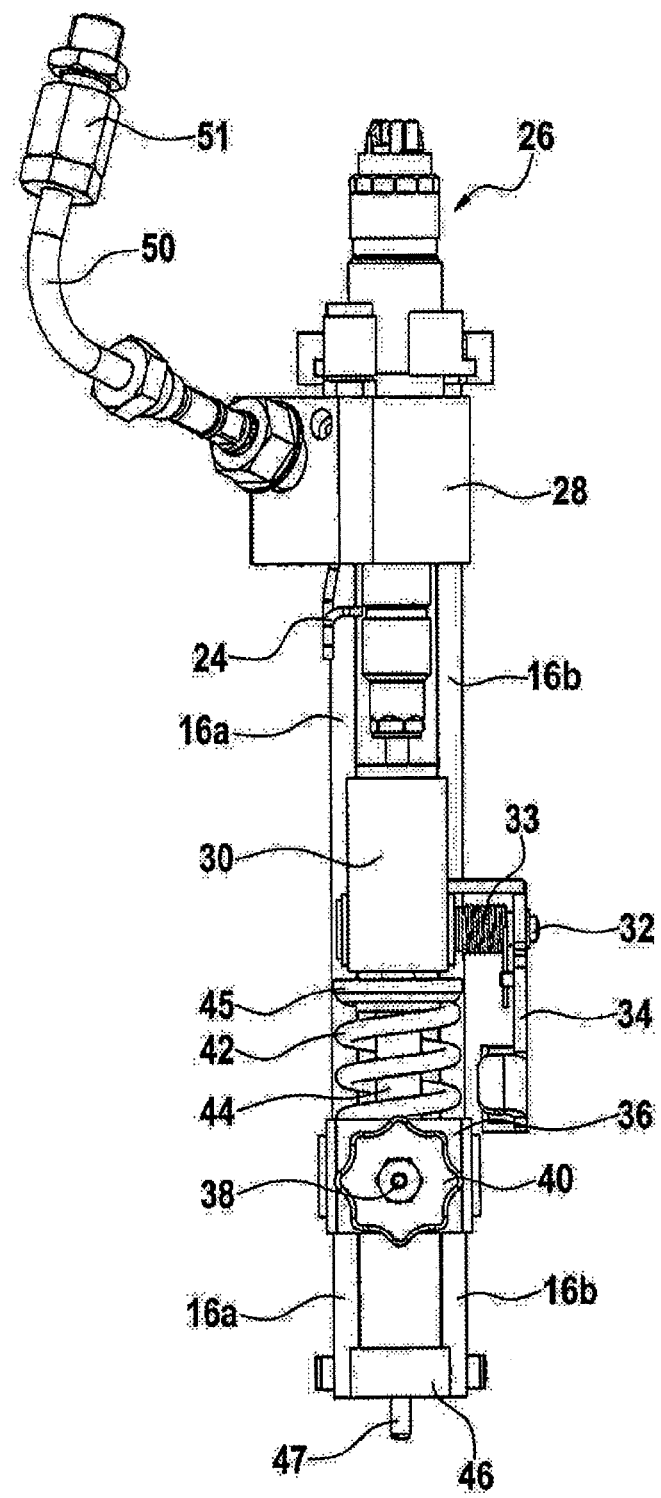
FIG. 3 shows a front view of an example holding device according to the present invention.

One exemplary embodiment of a holding device 14, according to the present invention, will be described in detail below, with reference to FIGS. 2 and 3.

An holding device 14 according to the present invention has a vertical guide, which is formed by two metal plates 16a, 16b running in the vertical direction and situated in parallel to each other.

The two metal plates 16a, 16b are connected to each other, at their upper ends by a mounting device 18 and at their lower ends by a holder 46, so that the two metal plates 16a, 16b, upper mounting device 18 and lower holder 46 form an essentially rectangular frame.

Lower holder 46 has two bolts 47, which are able to be inserted into bores 9 (see FIG. 1) that are developed in the horizontal leg of angle 10 mounted on frame 4, so as to mount holding device 14 on frame 4.

Upper mounting device 18 has a rear region 18a that is developed to have a bore, not visible in the figures, running vertically, i.e. parallel to metal plates 16a, 16b, which is provided to accommodate cylinder bolt 6a of a first elastic elements 6, as mounted on the upper end face of frame 4, in order to fix holding device 14 on frame 4.

A front region 18b of upper mounting device 18 is developed to accommodate an exchangeable clamping plate 20, which is preferably adapted individually to the specific type of injector that is to be accommodated in holding device 14. A fuel injector 26 that is to be tested is held with the aid of a suitable clamping plate 20 in upper mounting device 18.

Below upper mounting device 18, between guide rails 16a, 16b, a displaceable adapter accommodation 22 is provided for accommodating a preferably injector-specific test adapter 28. Test adapter 28 is connected to a fluid supply line (high pressure gun) 50, and is developed to supply the fluid provided by fluid supply line 50 to fuel injector 26 in the test operation. Test adapter 28 has on its rear side facing guide rails 16a, 16b a groove that fits adapter accommodation 22 and an elongated hole for accommodating adapter accommodation 22.

Below test adapter 28 thus positioned, a two-part fixing device 30, 36 is situated that is supported displaceably along guide rails 16a, 16b. Fixing device 30, 36 is displaceable so as to adapt to the length of fuel injector 26 in a stepless manner along guide rails 16a, 16b, so that the distance between fixing device 30, 36 and upper mounting device 18 is changeable by displacing fixing device 30, 36. Fixing device 30, 36 has an upper, first part 30, which faces fuel injector 26, and a lower, second part 36, which is situated on the side of upper part 30 facing away from fuel injector 26.

Second part 36 has a base body 37 that is supported displaceably between guide rails 16a, 16b. A shaft 38 runs through second part 36, at right angles to guide rails 16a, 16b, and through the space between guide rails 16a, 16b. Shown in FIG. 2 at the left front end of shaft 38, a handwheel 40 is fastened and at the opposite rear end of shaft 38 a clamping piece, not visible in the figures, is mounted, having internally recessed wedge surfaces. At guide rails 16a, 16b, bevels are developed that correspond to the clamping piece.

By rotating handwheel 40 and shaft 38, one is able to wedge the bevels developed in guide rails 16a, 16b with the wedge surfaces of the clamping piece. Thus, second part 36 of fixing device 30, 36 is able to be fixed at guide rails 16a, 16b by rotating handwheel 40, in such a way that displacing second part 36 along guide rails 16a, 16b is no longer possible.

Upper, first part 30 of fixing device 30, 36 is supported elastically on second part 36 by an elastic spring element 42, which is mounted using a guide bolt 44, a helical spring plate 45 and a holding part.

In first part 30, an injection chamber is developed which, in the testing operation, takes up the fluid that is output by fuel injector 26. The fluid is conveyed via a discharge line 48 from the injection chamber to a measuring device, to measure the volume of the fluid output by fuel injector 26.

In first part 30, an eccentric shaft 32 is situated, which is rotatable about its longitudinal axis by an eccentric shaft lever 34 that is mounted on one outer end of eccentric shaft 32.

In order to replace test adapter 28 along with fuel injector 26 into holding device 14, adapter accommodation 22 is pushed downwards via a lever 24 that is connected to adapter accommodation 22, and the fuel injector is introduced together with test adapter 28 mounted on it into a matching clamping plate 20, that is situated in mounting device 18. After resetting adapter accommodation 22 by pushing back lever 24, test adapter 28 along with fuel injector 26 is positioned in mounting device 18 with the aid of clamping plate 20.

In order to fix fuel injector 26 in holding device 14, at a detached state of the clamping device, second part 36 of fixing device 30, 36 is displaced along guide rails 16a, 16b until an upper end face of upper, first part 30 of fixing device 30, 36 touches the lower end face, facing fixing device 30, 36, of the nozzle adjusting nut of fuel injector 26. By rotating handwheel 40, the clamping device is activated and second part 36 of fixing device 30, 36 is locked on guide rails 16a, 16b. Subsequently, eccentric shaft 32 is rotated by operating eccentric shaft lever 34. Rotated eccentric shaft 32 presses on guide bolt 44 and, with that, on elastic spring element 42. Fuel injector 26 is braced using the initial stressing force and the additional force that comes about from the spring excursion of elastic spring element 42, between the lower end face of the nozzle adjusting nut of fuel injector 26 and its upper end, which is situated in mounting device 18, and is fixed securely in holding device 14.

Test adapter 28 used in each case is preferably specific to the injector. It is modeled on the respective cylinder head in which the respective fuel injector 26 is used during operation. Fluid supply line 50, which is provided for supplying fuel injector 26 with fluid in test operation is installed at an appropriate angle in test adapter 28. Around high pressure gun 50 there is a sleeve nut 51, which advances and retracts as high pressure gun 50 rotates. Thereby high pressure gun 50 itself is not rotated by contacting fuel injector 26.

Between eccentric shaft lever 34 and first part 30 of fixing device 30, 36 a torsion spring 33 is mounted on eccentric shaft 32, which is developed to hold eccentric shaft 32 in a desired position, even against the force of spring element 42.

Figure 4:
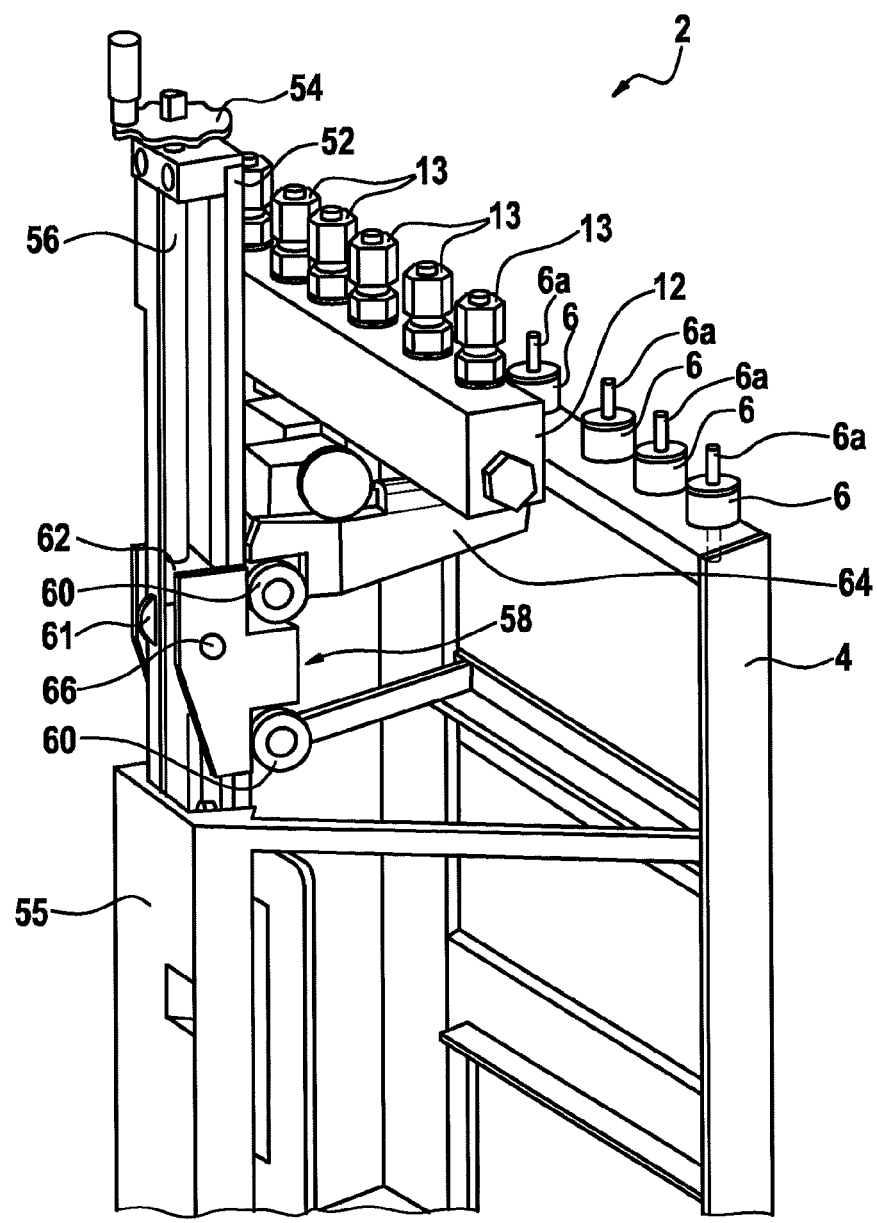
FIG. 4 shows a perspective view of a section of an example clamping device according to the present invention.

FIG. 4 shows a perspective view of a cutout of clamping device 2 from behind, in this representation no holding devices 14 being mounted on frame 4 of clamping device 2.

This view particularly shows how distributor rail 12 is mounted on clamping device 2 in a manner that is adjustable as to height. The height adjustment of distributor rail 12 is implemented via a hoisting carriage 58. In frame 55 of clamping device 2 a vertical guideway 52 formed of flat steel is fastened. On guideway 52 there is a hoisting carriage 58. For its lateral guidance, hoisting carriage 58 has a tight tolerance and small rollers 60, 61, which guide hoisting carriage 58 in the direction of loading. The rear small rollers 61 facing away from the frame are supported on a rotatable eccentric axle 66, so that the play is adjustable by rotating eccentric axle 66.

Hoisting carriage 58 is held on the rear side of vertical guideway 52 facing away from frame 4 by a floating, non-rotatably supported nut 62. A rotatable spindle 56 is engaged with nut 62. At its upper end, spindle 56 is equipped with a crank 54. By turning crank 54 and spindle 56, hoisting carriage 58 is movable along guidance 52 in the vertical direction.

On hoisting carriage 58, at right angles to vertical guidance 52, a mounting support 64 is mounted using an elongated hole not visible in FIG. 4. Because of the elongated hole, an accommodation for distributor rail 12 is mounted displaceably on mounting support 64. The accommodation itself is made up of bent sheet metal, in which distributor rail 12 is supported rotatably using a holding plate, sliding bearing and axle. In order to avoid an undesired tilting of distributor rail 12, distributor rail 12 is held in an upright position by a pivot spring 67 which is particularly easy to see in FIG. 1.

What is claimed is:

1. A holding device for a fuel injector, the holding device comprising:
    a mounting device configured to accommodate a fuel injector; and
    a fixing device including a first part and a second part which are supported displaceably in a guidance element with respect to the mounting device;
    wherein the second part is able to be fixed on the guidance element and wherein between the first part and the second part of the fixing device an elastic element is situated in such a way that it is in a position to press the first part of the fixing device against a fuel injector situated in the mounting device to fix the fuel injector in the holding device.

2. The holding device as recited in claim 1, further comprising:
    an eccentric shaft which is rotatable between a clamping position, in which the elastic element presses the first part of the fixing device against a fuel injector situated in the mounting device, and a release position, in which the elastic element does not exert any force on the first part of the fixing device.

3. The holding device as recited in claim 1, wherein an injection chamber is developed in the first part of the fixing device.

4. The holding device as recited in claim 1, wherein the mounting device is configured to accommodate an exchangeable clamping plate, in which the fuel injector is able to be fixed.

5. The holding device as recited in claim 1, wherein the fixing device is able to be fixed on the holding device by a clamping device.

6. The holding device as recited in claim 1, further comprising:

an exchangeable test adapter configured to supply fluid to the fuel injector during operation.

7. The holding device as recited in claim 6, wherein the test adapter is mounted on the holding device displaceably with respect to the mounting device.

8. The holding device as recited in claim 7, wherein the test adapter is configured to fix the fuel injector elastically in the mounting device.

9. A test device, comprising:
a clamping device; and
at least one holding device for a fuel injector, including a mounting device configured to accommodate a fuel injector, and a fixing device including a first part and a second part which are supported displaceably in a guidance element with respect to the mounting device, wherein the second part is able to be fixed on the guidance element and wherein between the first part and the second part of the fixing device an elastic element is situated in such a way that it is in a position to press the first part of the fixing device against a fuel injector situated in the mounting device to fix the fuel injector in the holding device;
wherein the at least one holding device is fastened elastically supported on the clamping device.

10. The test device as recited in claim 9, wherein the clamping device has a distributor rail, which is displaceably supported with respect to the at least one holding device.

\* \* \* \* \*